United States Patent
Chen et al.

(10) Patent No.: US 7,164,080 B2
(45) Date of Patent: Jan. 16, 2007

(54) BEZEL MOUNTING ASSEMBLY

(75) Inventors: Yun Lung Chen, Tu-Chen (TW); Da Long Sun, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 295 days.

(21) Appl. No.: 10/946,452

(22) Filed: Sep. 20, 2004

(65) Prior Publication Data

US 2005/0062374 A1    Mar. 24, 2005

(30) Foreign Application Priority Data

Sep. 19, 2003    (TW) .............................. 92216902 U

(51) Int. Cl.
*H02G 3/08*    (2006.01)

(52) U.S. Cl. .......................... 174/50; 174/66; 174/520; 361/726; 312/223.2

(58) Field of Classification Search ................. 174/50, 174/66, 520; 361/679–683, 724–727; 312/223.2, 312/223.1, 265.5, 285–287; 220/4.02; 439/535; 292/19.91

See application file for complete search history.

(56) References Cited

U.S. PATENT DOCUMENTS

| 4,257,555 | A | * | 3/1981 | Neel | ............................ | 236/94 |
| 5,123,680 | A |   | 6/1992 | Liu |   |   |
| 6,798,652 | B1 | * | 9/2004 | Wang et al. | ................ | 361/685 |
| 7,067,735 | B1 | * | 6/2006 | Murata | ........................ | 174/50 |

* cited by examiner

*Primary Examiner*—Dhiru R. Patel
(74) *Attorney, Agent, or Firm*—Wei Te Chung

(57) ABSTRACT

A bezel mounting assembly of the present invention includes a bezel (10), a front panel (30) defining a pair of first slots (32) therein, and an arc-shape resilient member (20) attached to the bezel for detaching the bezel from the front panel. The bezel includes a pair of first hooks (12) corresponding to the first slots of the front panel. A pair of retaining pieces (16) is formed on the bezel and each defines a sliding slot (17) therein. A cutout (18) is defined in a bottommost portion of the bezel. The resilient member includes a pressing portion (22). A number of protrusions (26) are formed on the resilient member and are received in the corresponding sliding slots of the bezel. The pressing portion is pressed to drive the first hook outwardly; the first hooks are thereby disengaged from the first slots of the front panel.

18 Claims, 6 Drawing Sheets

BEZEL MOUNTING ASSEMBLY

BACKGROUND OF THE INVENTION

1. Field of the Invention

The present invention relates to a mounting assembly, and more particularly to a computer bezel mounting assembly with a simplified configuration and convenient usability.

2. Description of Prior Art

A typical bezel is mounted to a computer case by means of a plurality of set screws or fasteners attached to the bezel and engaged in a plurality of fixing holes defined in the computer case. A typical bezel mounting assembly is disclosed in Taiwan Patent No. 115,733. The mounting assembly comprises a chassis and a bezel. Two sidewalls of the chassis each define a plurality of receiving slots in front portions thereof. Side edges of the bezel have a plurality of barbs engaging in corresponding slots of the chassis, thereby connecting the front bezel to the chassis. However, this mounting assembly requires the bezel to have numerous barbs, which makes detachment of the bezel from the chassis inconvenient and laborious. Additionally, the barbs are liable to break when too much force is applied thereon during the detachment process.

Another typical bezel mounting assembly is disclosed in U.S. Pat. No. 5,123,680. A fastening device comprising a fastener having a base fixed on the front panel of a computer case and a plurality of resilient legs hanging therefrom. Each resilient leg has an outward convex foot formed on the end thereof so that when the fastener is pushed into a retaining hole formed on the computer case to connect the front panel to the computer casing, the feet of the fastener are slightly and temporarily pushed inward when passing through the retaining hole and then bounce back to retain the fastener in position when completely passing the retaining hole. This mounting assembly requires a plurality of additional resilient legs with specific configurations in order to mount the bezel, which makes manufacturing of the mounting assembly more time-consuming costly. Moreover, it is rather inconvenient and laborious to detach all the resilient legs tightly engaged in the retaining slots.

SUMMARY OF THE INVENTION

Accordingly, an object of the present invention is to provide a bezel mounting assembly with a simplified configuration and convenient usability.

To achieve the above object, a bezel mounting assembly of the present invention comprises a bezel, a front panel defining a pair of first slots therein, and an arc-shape resilient member attached to the bezel for detaching the bezel from the front panel. The bezel comprises a pair of first hooks at the positions corresponding to the first slots of the front panel. A pair of retaining pieces is formed on the bezel besides each of the first hooks and each defines a sliding slot therein. A cutout is defined in a bottommost portion of the bezel. The resilient member comprises a pressing portion. Two pairs of protrusions are formed on the resilient member and are received in the corresponding sliding slots of the bezel. The pressing portion is pressed to drive the first hook of the bezel outwardly; the first hooks are thereby detached from the first slots of the front panel.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
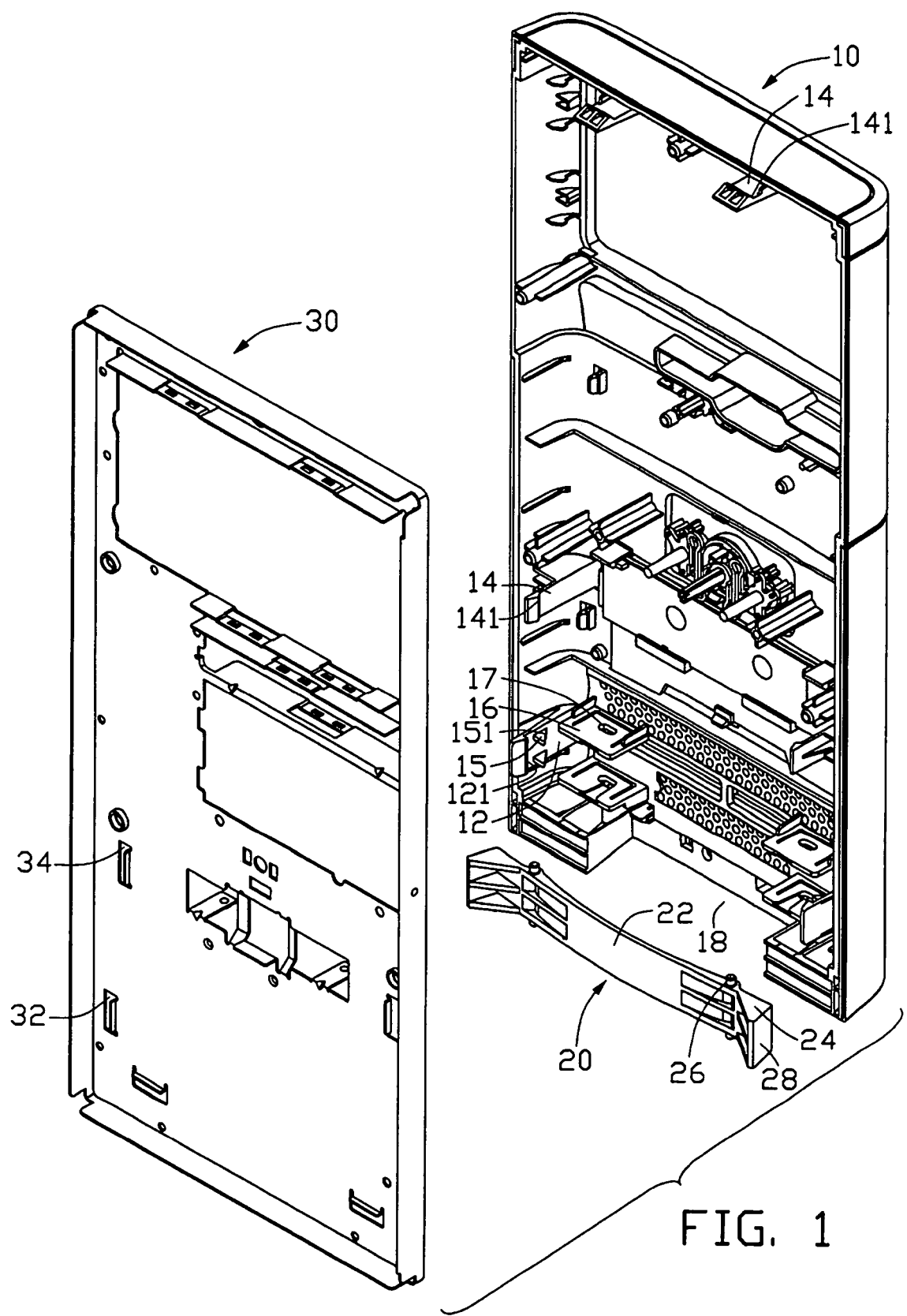
FIG. 1 is an exploded, isometric view of a bezel mounting assembly in accordance with the present invention.
Figure 2:
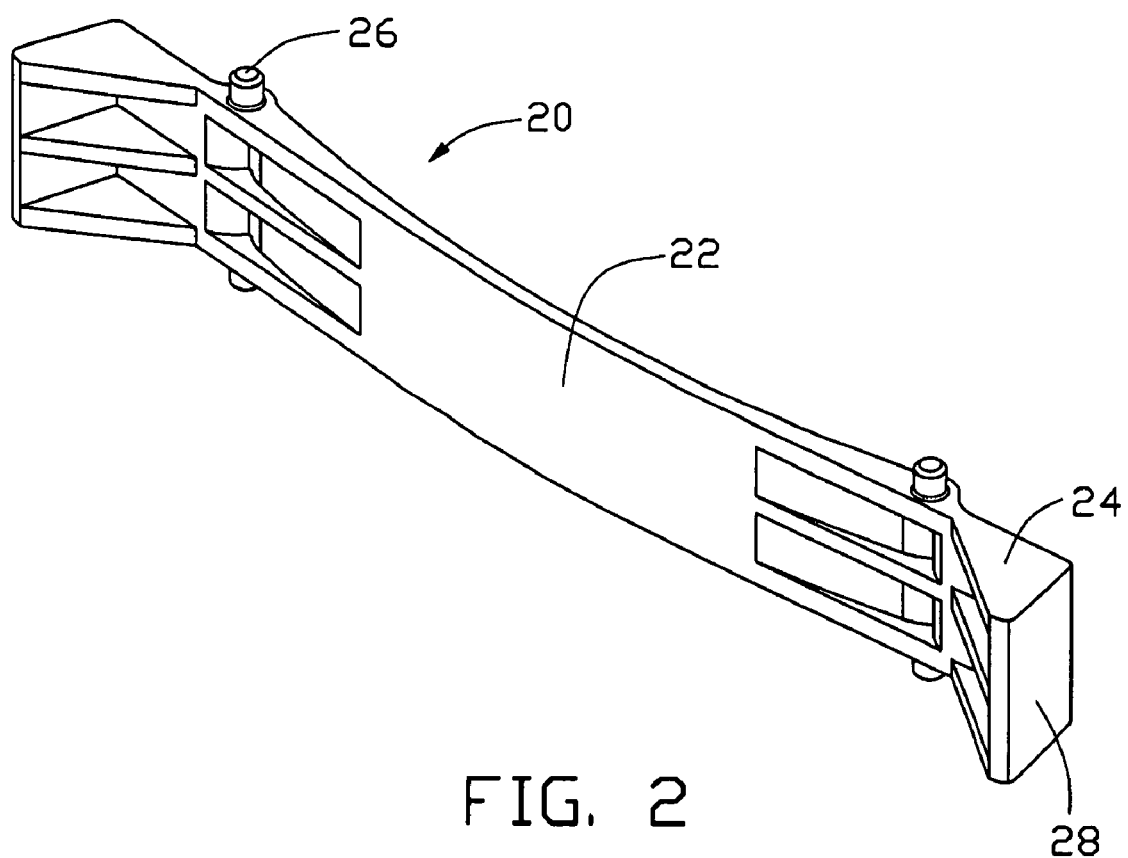
FIG. 2 is an isometric view of a resilient member of FIG. 1.
Figure 3:
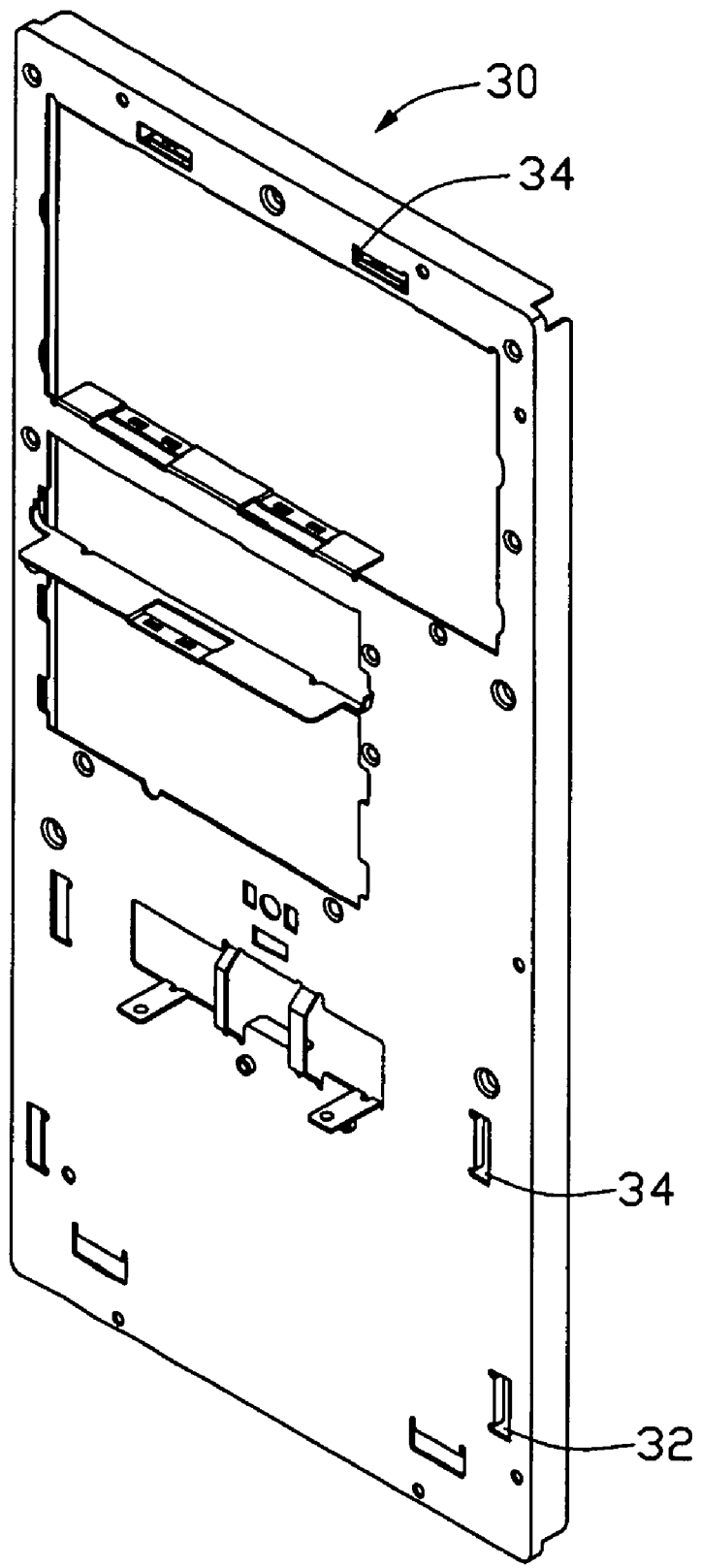
FIG. 3 is an isometric view of a front panel of the bezel mounting assembly of FIG. 1.

Referring to FIGS. 1 to 3, and 6, a bezel mounting assembly in accordance with a preferred embodiment of the present invention comprises a bezel 10, a front panel 30 of a computer enclosure 50, and a resilient member 20 assisting in detaching the bezel 10 from the front panel 30.

The bezel 10 is generally arch-shaped, the bezel 10 comprising a main portion (not labeled) and a pair of side portions (not labeled). A pair of spaced first hooks 12 is formed symmetrically on a bottom end of the bezel 10 at opposite side portions. The first hooks 12 each comprise a straight inner surface 121 at a forepart thereof. A pair of vertically spaced wedge-shaped touching blocks 15 is integrally formed besides the straight inner surface 121 on each first hook 12, each touching block 15 comprises an inclined side 151. A pair of vertically spaced retaining pieces 16 is formed on the main portion of the bezel 10 adjacent each first hook 12, each retaining piece 16 defines a sliding slot 17 therein. The retaining pieces 16 are parallel to each other and perpendicular to the bezel 10. The bezel 10 defines a cutout 18 in a bottommost edge of the main portion thereof. A pair of second hooks 14 is symmetrically formed on the bezel 10 at a top edge of the main portion, and another pair of opposite second hooks 14 is symmetrically formed at a center portion of the bezel 10. The second hooks 14 each comprise an inclined inner surface 141.

The front panel 30 defines a pair of first slots 32 and two pairs of second slots 34 therein, corresponding to the first hooks 12 and the second hooks 14 of the bezel 10 respectively.

The resilient member 20 is generally arch-shaped, and comprises a pressing portion 22 and two operating portions 24 integrally extending from two distal ends of the pressing portion 22. A pair of protrusions 26 is formed on top and bottom edges respectively of the resilient member 20 adjacent a junction of the pressing portion 22 and each operating portion 24. Each operating portion 24 comprises a matching surface 28, corresponding to the inclined sides 151 of the touching blocks 15.

Figure 4:
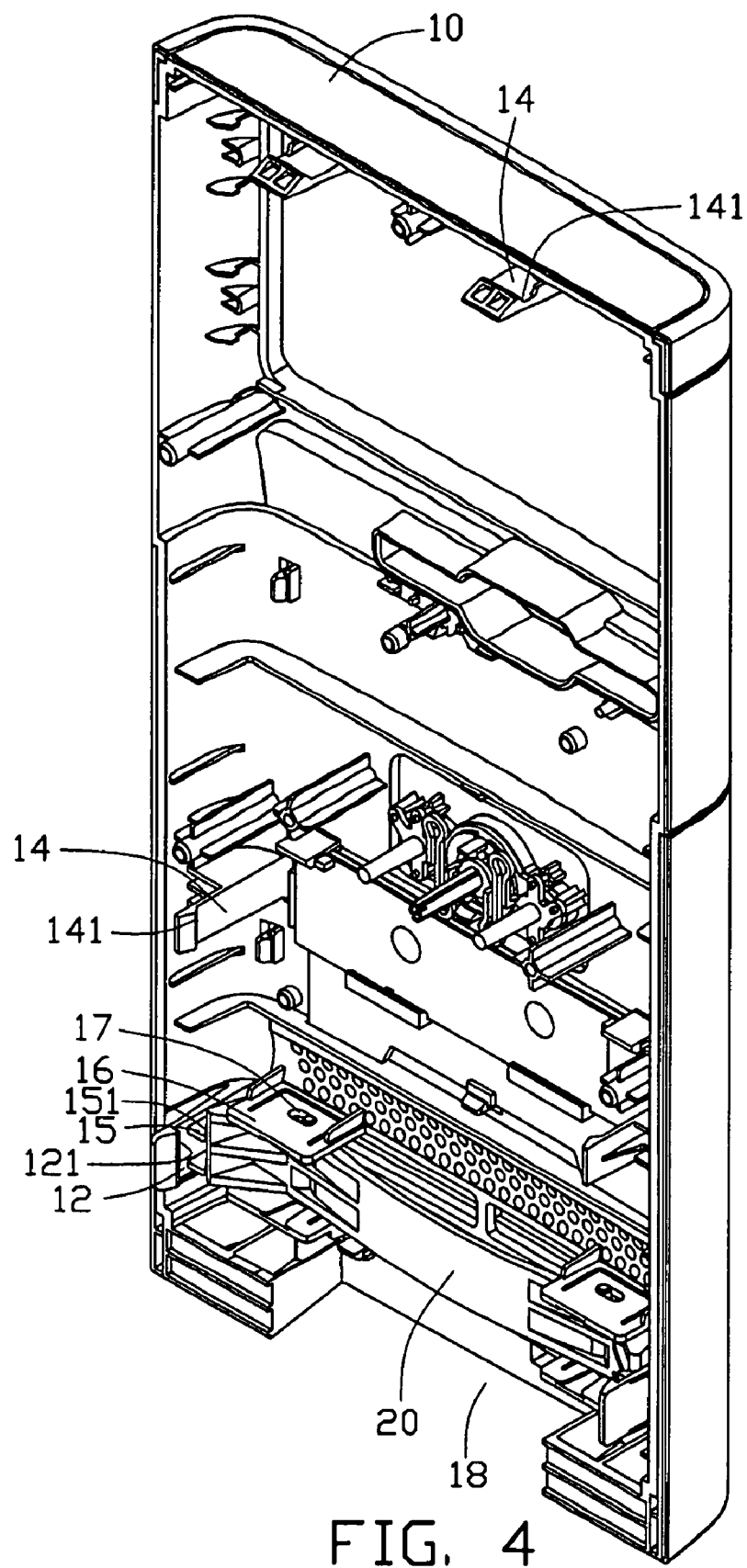
FIG. 4 is an assembled view of a bezel and the resilient member of FIG. 1.
Figure 5:
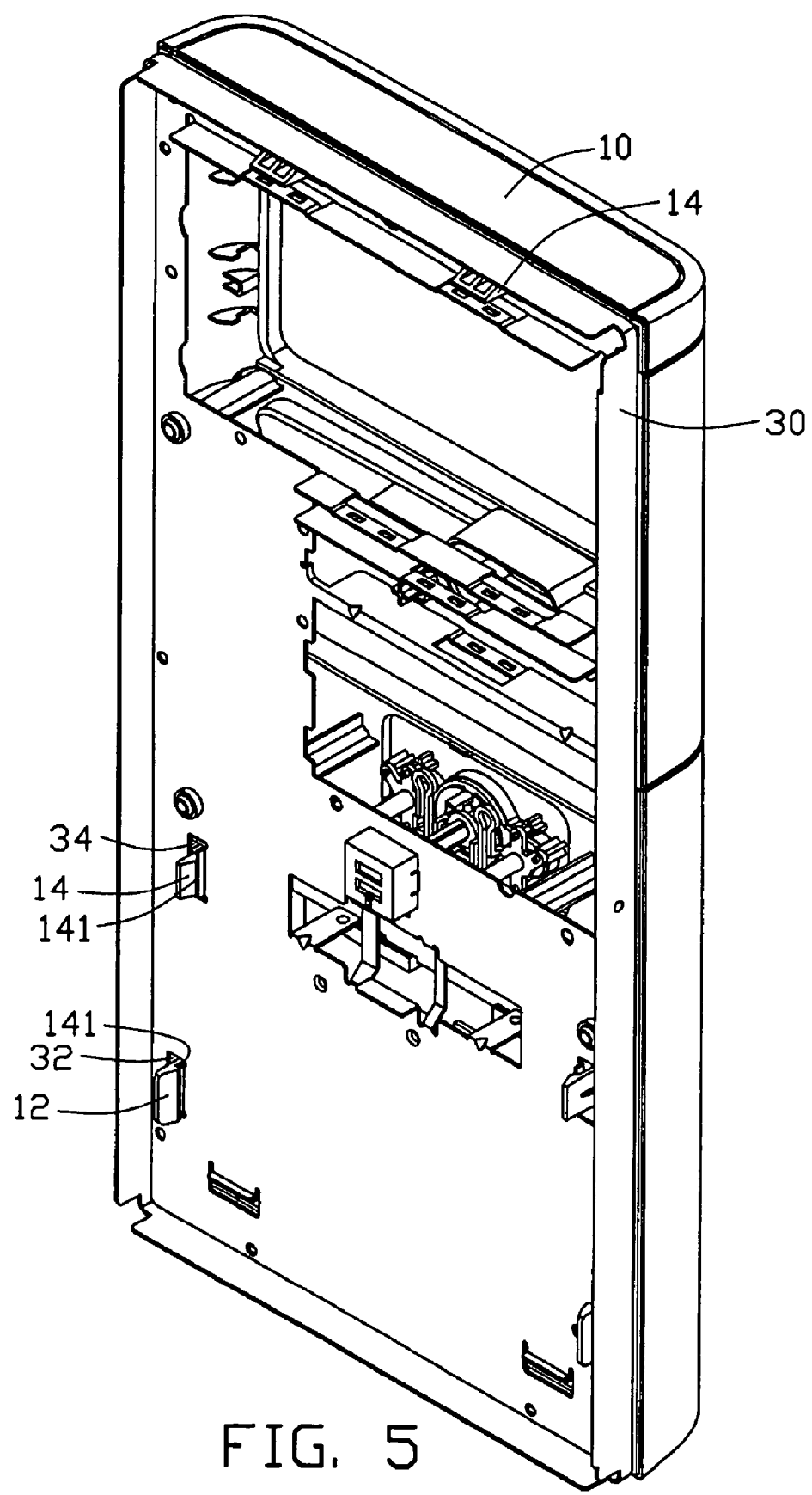
FIG. 5 is an assembled view of FIG. 1.
Figure 6:
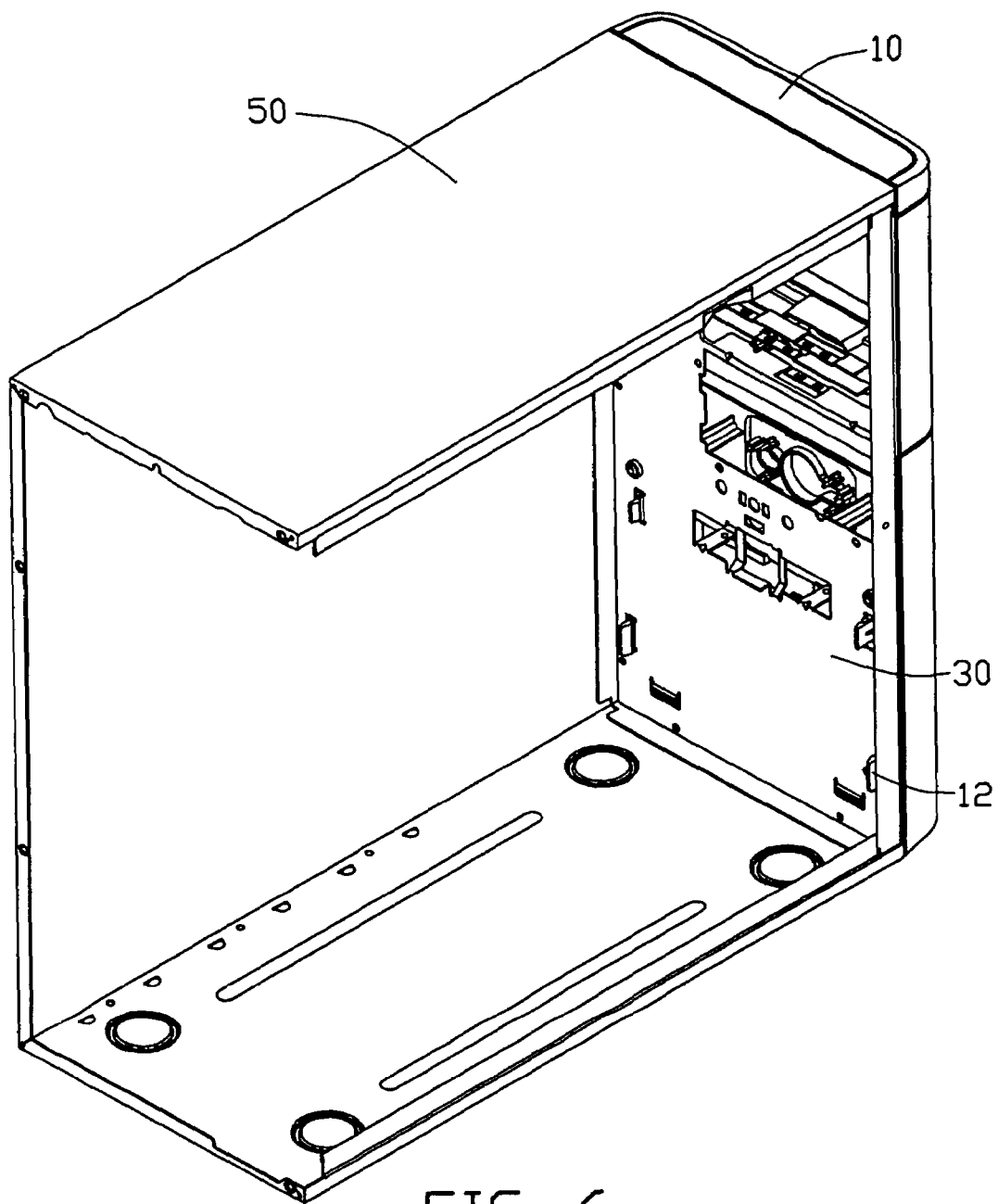
FIG. 6 is an assembled view of FIG. 1 together with a computer enclosure.

Referring to FIGS. 4 and 5, in assembly, the protrusions 26 of the resilient member 20 are firstly extended through corresponding sliding slots 17 of the bezel 10. Thus the resilient member 20 is slideably attached to the bezel 10 with the pressing portion 22 spacing away from the main portion of the bezel 10. Thereafter the first and second hooks 12, 14 are preliminarily partially received in corresponding first and second slots 32, 34 of the front panel 30. Then the bezel 10 is pressed toward the front panel 30, and the first and second hooks 12, 14 are fully driven through corresponding first and second slots 32 to catch an inside of the front panel 30. The bezel 10 is thus securely attached to the front panel 30. At this position the matching surfaces 28 of the resilient member 20 adjoin the corresponding inclined sides 151 of the touching blocks 15 respectively.

In disassembly, a user presses the pressing portion 22 of the resilient member 20 toward the main portion of the bezel 10 through the cutout 18. The protrusions 26 slide along in corresponding sliding slots 17. The operating portions 24 are driven away from the main portion of the bezel 10, and the matching surfaces 28 begin to press against the touching blocks 15 on the inclined surfaces 151. The first hooks 12 of the bezel 10 are thereby driven, so that the first hooks 12 are released from engagement in the first slots 32 of the panel 30. Then, the bezel 10 can be easily detached from the front panel 30.

In the above embodiment, the protrusions 26 can also be formed on the retaining pieces 16 of the bezel 10, and a pair of sliding slots receiving the protrusions 26 is defined in common boundaries of the pressing portion 22 and the operating portions 24 respectively.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A bezel mounting assembly comprising:
    a front panel defining a pair of first slots and a pair of second slots therein;
    a bezel attached to the front panel, the bezel comprising a pair of first hooks and a pair of second hooks engaging in the first slots and the second slots of the front panel, a cutout defined in a bottommost portion of the bezel; and
    a resilient member slidably attached to the bezel between the first hooks, comprising a pressing portion and two operating portions extending from two distal ends of the pressing portion, the cutout providing access to the resilient member;
    wherein the pressing portion is pressed, so that the operating portions are extended to drive the first hooks of the bezel outwardly, the first hooks are thereby disengaged from the first slots of the front panel.

2. The bezel mounting assembly as claimed in claim 1, wherein a pair of retaining pieces is formed besides each of the first hooks, and each defines a sliding slot therein, a plurality of protrusions is formed on the resilient member, and is slidably received in corresponding one of said sliding slots.

3. The bezel mounting assembly as claimed in claim 1, wherein the first hooks each comprises a straight inner surface, the second hooks each comprises an inclined surface.

4. The bezel mounting assembly as claimed in claim 1, wherein a touching block is formed on each of the first hooks.

5. The bezel mounting assembly as claimed in claim 4, wherein the touching block comprises an inclined side, the operating portions of the resilient member each slide along the inclined side.

6. The bezel mounting assembly as claimed in claim 5, wherein each of the operating portions is a convex block and comprises a matching surface cooperating with the inclined side of the touching block.

7. The bezel mounting assembly as claimed in claim 6, wherein the pressing portion of the resilient member is arc-shaped.

8. A bezel mounting assembly comprising:
    a bezel forming a first hook thereon, the first hook comprising a touching block, a cutout defined in the bezel adjacent the first hook;
    a front panel defining a first slot therein in engagement with the first hook; and
    a resilient member slidably attached to the bezel, the resilient member comprising a pressing portion and an operating portion, the cutout providing access to the resilient member;
    wherein the pressing portion is pressed, so that the operating portion slides along the touching block, thereby driving the first hook to disengage from the first slot.

9. The bezel mounting assembly as claimed in claim 8, wherein the first hook is formed on an edge of a bottom portion of the bezel, the cutout is defined in a bottommost portion of the bezel.

10. The bezel mounting assembly as claimed in claim 8, wherein the first hook comprises a straight inner surface.

11. The bezel mounting assembly as claimed in claim 8, wherein the touching block comprises an inclined side facing the bezel along which the operating portion of the resilient member slides.

12. The bezel mounting assembly as claimed in claim 11, wherein the operating portion is a convex block, and comprises a matching surface cooperating with the inclined side of the touching block.

13. The bezel mounting assembly as claimed in claim 8, wherein a pair of retaining pieces is extended from the bezel and each defines a sliding slot therein.

14. The bezel mounting assembly as claimed in claim 13, wherein a plurality of protrusions is formed on the resilient member received in corresponding one of said sliding slots.

15. The bezel mounting assembly as claimed in claim 8, wherein the bezel further comprises a pair of second hooks, the front bezel defines a pair of second slots corresponding to the second hooks.

16. The bezel mounting assembly as claimed in claim 15, wherein the second hooks each comprise an inclined inner surface.

17. A bezel mounting assembly comprising:
    a bezel and a front panel assembled to each other generally along a front-to-back direction;
    said bezel forming a hook thereon, and a cutout defined in the bezel adjacent the hook; and
    said front panel defining a slot therein in engagement with the hook; and
    a resilient member moveably attached to the bezel, the resilient member comprising a pressing portion and an operating portion, the cutout providing access to the resilient member; wherein
    when the pressing portion is manually pressed, along a back-to-front direction opposite to said front-to-back direction, via access through said cutout, the operating portion deflects the hook to be disengaged from the slot, so as to allow the bezel to be moved away from the bezel along said back-to-front direction.

18. The bezel mounting assembly as claimed in claim 17, wherein said operation portion is moved in a lateral direction perpendicular to said back-to-front direction when said pressing portion is pressed along said back-to-front direction.

* * * * *